United States Patent
Baroud et al.

(10) Patent No.: US 8,136,553 B2
(45) Date of Patent: Mar. 20, 2012

(54) MICROFLUIDIC CIRCUIT HAVING AN ACTIVE COMPONENT

(75) Inventors: Charles Baroud, Paris (FR); Jean-Pierre Delville, Talence (FR); Régis Wunenburger, Bordeaux (FR); Patrick Huerre, Paris (FR)

(73) Assignees: Centre National de la Recherche Scientifique, Paris (FR); Ecole Polytechnique, Palaiseau Cedex (FR)

( * ) Notice: Subject to any disclaimer, the term of this patent is extended or adjusted under 35 U.S.C. 154(b) by 1075 days.

(21) Appl. No.: 11/572,242

(22) PCT Filed: Jul. 7, 2005

(86) PCT No.: PCT/FR2005/001756
§ 371 (c)(1),
(2), (4) Date: Dec. 19, 2007

(87) PCT Pub. No.: WO2006/018490
PCT Pub. Date: Feb. 23, 2006

(65) Prior Publication Data
US 2008/0196778 A1    Aug. 21, 2008

(30) Foreign Application Priority Data
Jul. 19, 2004  (FR) .................................. 04 07988

(51) Int. Cl.
*F15C 1/04* (2006.01)
(52) U.S. Cl. ............ 137/828; 137/806; 417/48; 417/207
(58) Field of Classification Search ............ 137/825, 137/827, 828, 806; 417/48, 51, 52, 207–209
See application file for complete search history.

(56) References Cited

U.S. PATENT DOCUMENTS

| | | |
|---|---|---|
| 2002/0031835 A1 | 3/2002 | Schwartz |
| 2002/0181837 A1 | 12/2002 | Wang et al. |
| 2003/0047688 A1 | 3/2003 | Faris et al. |
| 2005/0129529 A1* | 6/2005 | Cho .............................. 417/207 |

FOREIGN PATENT DOCUMENTS

| | | | |
|---|---|---|---|
| WO | WO 02/091028 A | | 11/2002 |
| WO | WO 2004/016948 | * | 2/2004 |
| WO | WO 2004/016948 A | | 2/2004 |

* cited by examiner

*Primary Examiner* — Craig Schneider
(74) *Attorney, Agent, or Firm* — Alston & Bird LLP

(57) ABSTRACT

A microfluidic circuit comprising microchannels (24, 26) containing different fluids (F1, F2), with a laser beam being focused at (32) on an interface (30) between the fluids so as to form a pump, a valve, or a mixer, for example.

12 Claims, 3 Drawing Sheets

MICROFLUIDIC CIRCUIT HAVING AN ACTIVE COMPONENT

CROSS-REFERENCE TO RELATED APPLICATIONS

This is a national phase application under 35 U.S.C. 371 of International Application PCT/FR2005/01756 filed Jul. 7, 2005, which claims priority from French application No. 0407988 filed Jul. 19, 2004.

FIELD AND BACKGROUND OF THE INVENTION

The invention relates to a microfluidic circuit comprising at least one component capable of acting on a fluid present in the circuit, in particular to create a flow of the fluid in the circuit, to block the flow, to direct and steer the flow, and/or to mix the fluid with another fluid, amongst other possibilities.

The microfluidics devices present a certain number of technical problems that have not been solved in satisfactory manner until now, these problems relating to transporting a fluid in a microchannel, which is made difficult because of the reversibility of fluid mechanics at small scale, and also relating to providing valves capable of shutting off microchannels in leaktight manner.

Proposals have already been made to form microchannels in a flexible polymer, with pressure being applied thereon to close a channel by flattening it, thereby constituting a microvalve. It is also possible to form a peristaltic type pump by means of a series of three such valves which are actuated in a given order.

Other known solutions make use of an electric field for moving an ionized fluid (electro-osmosis) or charged particles (electrophoresis).

Another known solution consists in using electrical resistor elements to apply heat locally to an interface between two non-miscible fluids in order to cause one of the fluids to move by thermocapillary convection or the Marangoni effect.

Proposals have also been made to move materials and fluids by means of beads trapped in "multiple optical tweezers" generated by a narrowly focused light beams (work by K. Ladavac and D. Grier).

All of those solutions have drawbacks. Those that make use of the Marangoni effect have the advantage of creating an overall flow of fluid, but they are difficult to implement. Implementation makes use of electrical resistor elements placed on a microchannel fed with a first fluid in the vicinity of the outlet from another microchannel for bringing in a second fluid that is to form a bubble in the first fluid. The electrical resistor element(s) heat(s) one side of the interface between the two fluids to create a temperature gradient along the interface, thereby causing the first fluid to move towards lower temperatures, and thus inducing overall movement of the fluid in a determined direction (see document U.S. Pat. No. 6,533,951).

In that known technique, the heating resistor elements are integrated in the microfluidic circuit during manufacture, so that it is not possible to modify their locations and characteristics. Such integration also leads to an increase in the cost of the circuit. Furthermore, although it is easy to apply heat by powering the resistor elements, nothing is provided for cooling, and the pumping effect continues over a certain length of time after the power supply to the resistors has been stopped, until they return to ambient temperature.

SUMMARY OF THE INVENTION

An object of the invention is to provide a microfluidic circuit that does not present the drawbacks of known prior circuits.

Another object of the invention is to provide a microfluidic circuit that is adaptable and modifiable at will at the level of its components that act on the fluid to set it into movement, to stop it, to mix it, and to measure it, amongst other possibilities.

Another object of the invention is to provide a microfluidic circuit comprising active components of the above-specified type, that can be controlled without interacting directly with the circuit itself, and thus without risk of degrading or deteriorating the circuit while the active components are being controlled or operated.

To this end, the invention provides a microfluidic circuit comprising at least one microchannel containing a first fluid and at least one component capable of acting on the fluid by thermocapillary convection, the circuit being characterized in that it includes means for focusing a laser beam on the interface between said fluid and a second fluid, the microchannel being formed in a material that is transparent to said laser beam, and the second fluid being present at least locally in said microchannel.

Focusing the laser beam on the interface between the two fluids through the transparent material of the microcircuit makes it possible to act on said interface without acting on the microcircuit itself, and thus without any risk of degrading or wearing the microcircuit. Focusing the laser beam on the interface between the two fluids suffices to obtain the desired effect and avoids integrating electrical components in the microcircuit.

When the two fluids are not miscible, the effect may consist in causing the first fluid to move in a direction that is determined by the temperature gradient at the interface between the two fluids, the laser beam then performing the function of a pump.

According to another characteristic of the invention, the laser beam may be focused on the interface between the two fluids in a zone of the first microchannel that is situated immediately downstream from at least one or two second microchannels that open out face to face into the first microchannel and that convey flows of the second fluid.

The laser beam then prevents the first fluid from flowing in the first microchannel, and performs the function of a valve.

The valve presents the advantage of not having any moving member. It is very simple to control, and control need involve no more than adjusting the emission power of the laser beam.

According to yet another characteristic of the invention, the second fluid is formed by a bubble of gas in a zone of confluence between the first fluid and a third fluid, which fluids are miscible with each other, and the laser beam is focused on a solid that serves to hold a bubble and that might have been used to form the bubble.

The shape of the bubble changes very quickly in complex manner while it is being illuminated by the laser beam, thus inducing flows in the first and second fluids at the interface with the bubble, which flows are random in time, thereby mixing together these two fluids, which may be of any kind, being of the same type or of different types.

The invention thus makes it possible to create a "chaotic" mixer for two or more fluids, and provides a simple and effective solution to the problem of mixing fluids in microfluidic circuitry, which problem cannot be solved in conventional manner because of the impossibility, at small scale, of forming a flow that is turbulent.

According to yet another characteristic of the invention, the laser beam can be used to form micromeasuring means operating on the same principle as the above-described valve, by allowing the first fluid to flow for a short time interval along the first microchannel.

It is also possible to use the laser beam to form microdrops by causing it to act at predetermined time intervals on the fluid flow in the first microchannel, the drops that are formed possibly having sizes that differ as a function of the lengths of time the laser beam acts on the flow.

It is also possible to use the laser beam to steer the fluid flow in a particular direction, and thus to perform sorting or separation on different fluids.

The power of the laser beam used in the invention is typically of the order of 10 milliwatts (mW) to 50 mW, which power varies with the natures of the fluids or solutions used. Provision is also made to change the wavelength of the laser in order to tune it on the absorption band of a fluid under consideration.

By using a laser beam and means for rapidly scanning predetermined zones of a microfluidic circuit with the laser beam, the invention makes it possible to provide a circuit having pumps, valves, mixers, and measuring means, with the speed with which the laser beam is moved from one zone to another being fast compared with the reaction time of the fluids.

BRIEF DESCRIPTION OF THE DRAWINGS

The invention can be better understood and other characteristics, details, and advantages thereof appear more clearly on reading the following description made by way of example with reference to the accompanying drawings, in which.

DETAILED DESCRIPTION

Figure 1:
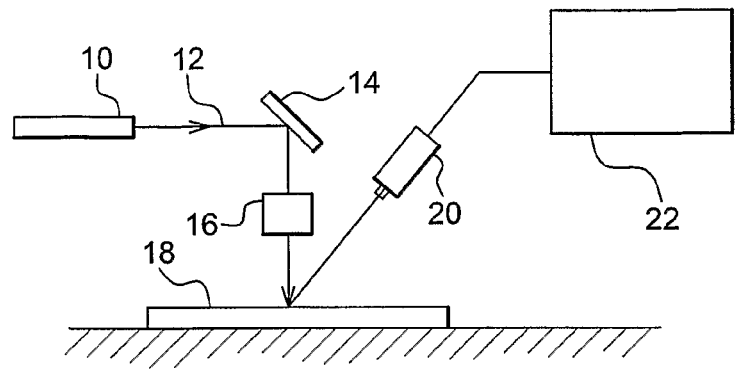
FIG. 1 is a diagram of a microfluidic circuit device of the invention.

The device of FIG. 1 comprises a laser generator 10 such as, for example, an ionized argon generator that emits continuously or in pulses at a repetition of frequency greater than about 1 kilohertz (kHz), at a wavelength of 514 nanometers (nm), and with power typically lying in the range 10 mW to 50 mW. It is also possible to use a laser diode or a yttrium aluminum garnet (YAG) type laser, for example.

The laser beam 12 is guided by reflector means 14 towards a microscope lens 16 enabling it to be focused accurately in a zone of a microchannel in a microfluidic circuit that is formed, for example, in a plate 18 of suitable material, e.g. a polymer such as polydimethyl siloxane (PDMS) by using a common technique of flexible lithography.

In an embodiment, the microchannels are formed in the surface of the plate 18 and a glass microscope slide is stuck thereon.

Typically, the microchannels are about 100 micrometers ($\mu$m) wide and about 50 $\mu$m deep. Nevertheless, these dimensions can vary over a wide range between a nanometer scale and a millimeter scale.

A camera 20 coupled to a microscope lens serves to observe what is taking place in the circuit 18 and to display it on the screen 22 of a data processor system.

Advantageously, and as can be seen better from the description below, the reflector means 14 enable the impact point of the laser beam on the circuit 18 to be moved at high speed in predetermined zones as a function of commands for the active components to be made such as, in particular: pumps, valves, mixers, measuring devices, steering means, separator and sorting means, etc.

Figure 2:
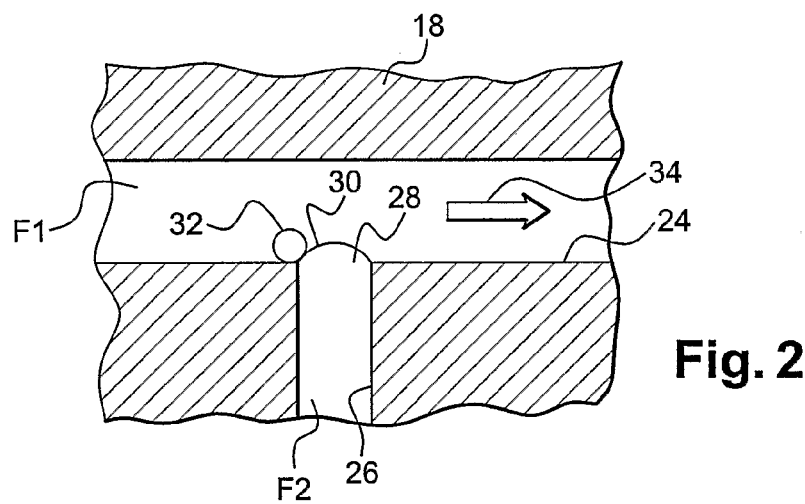
FIG. 2 is a large-scale diagrammatic view of a pump of the invention.

FIG. 2 shows an embodiment of a pump enabling a first fluid F1 to be caused to flow at a certain rate in a microchannel 24 of the above-mentioned circuit 18 by using a second fluid F2 that is not miscible with the first and that is present in a second microchannel 26 or a cavity of the circuit 18, this second microchannel 26 or this cavity opening out into the first microchannel 24. The second fluid F2 forms a drop or bubble 28 in the first fluid F1 where the second microchannel 26 opens out, and the laser beam 16 is focused on a portion of the interface 30 between the two fluids, e.g. in the zone identified marked at 32 which lies in the microchannel 24 at the upstream end of the interface 30 relative to the direction 34 in which it is desired to move the fluid F1.

Under such circumstances, the emission power of the laser beam 12 is of the order of 20 mW, for example, and the power available at the point of impact 32 is of the order of one-fifth the emission power, since losses in the reflector means 14 are relatively large. The dimensions of the point of impact of the laser beam in the zone 32 may be about 5 $\mu$m to 15 $\mu$m in diameter, for example, the size of the drop 28 at the opening of the microchannel 26 being arbitrary, e.g. lying in the range about 10 $\mu$m to about 500 $\mu$m.

The local heating of the interface 30 at the point 32 causes the fluid F1 to move over the interface, thus leading to overall movement in the fluid F1 from the inlet of the microchannel 24 to the interface 30. In microfluidics, small dimensions are advantageous for two reasons:

thermocapillary convection depends on the temperature/distance gradient; given the small dimensions concerned, this gradient can be large for a temperature difference that is small; and at low Reynolds numbers, the movement of the fluid at the interface 30 leads to movement in the fluid far from the interface, such that thermocapillary convection at the interface has an overall effect on the fluid F1.

Tests carried out with a fluid F1 constituted by air, or constituted by a mixture of water and fluorescein at a concentration of about 5% by weight, together with a fluid F2 that is a solution of hexadecane and a surfactant such as that known under the name Span 80, at a concentration of 2% by weight, have given the following results, with the laser beam 12 having power of about 20 mW:

when the fluid F1 is air, the flow speed may reach 500 micrometers per second ($\mu$m/s) in the microchannel 24; and when the fluid F1 is a solution of fluorescein in water, the speed is slower, and reaches about 50 $\mu$m/s.

Figure 3:
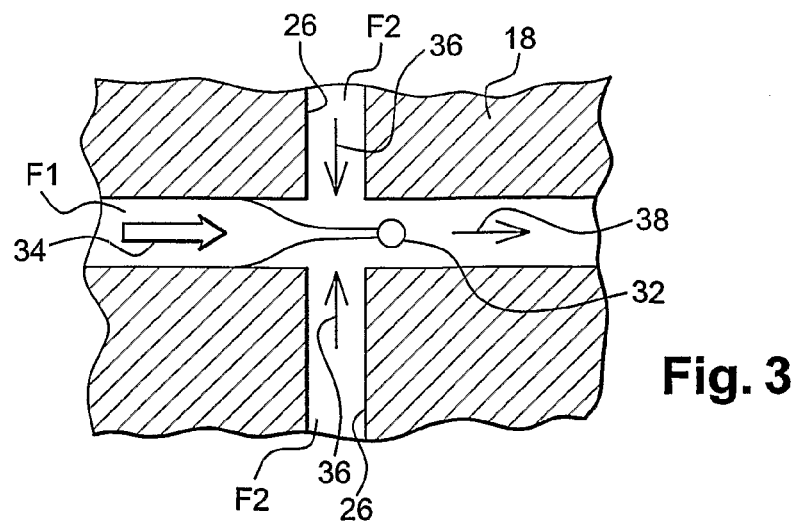
FIG. 3 is a large-scale diagrammatic view of a valve of the invention.

FIG. 3 is a diagram showing circumstances in which the active component constituted by the laser beam 12 focus on the circuit 18 is a valve.

In this configuration, the microchannel 24 of the circuit 18 conveys a flow of fluid F1 in the direction indicated by arrow 34 and it is intersected at right angles by two microchannels 26 that open out face to face into the microchannel 24, each of which carries a flow of a second fluid F2 in the directions indicated by the arrows 36, the flows of fluid F2 penetrating into the microchannel 24 and then flowing downstream as represented by arrow 38.

The laser beam 12 is focused on the interface between the first fluid F1 and the fluid F2 immediately downstream from the outlets of the microchannels 26, as shown at 32, thus having the effect of stopping almost instantaneously the flow of the fluid F1.

The flows of the second fluid F2 in the microchannels 26 and in the microchannel 24 appear not to be modified.

The time interval during which it is possible to block the flow of the fluid F1 is longer or shorter depending on the position of the point of impact 32 of the laser beam and on the flow rate of the fluid F1 in the microchannel 24.

Typically, this duration is several seconds and it may exceed 10 seconds.

When the microchannel 24 is fed with fluid F1 by said fluid being under pressure, as opposed to having a flow rate imposed thereon, the flow of the fluid F1 along the microchannel 24 can be blocked for a duration that is indefinite.

As mentioned above, the dimension of the point of impact of the laser beam may be about 10 μm, with the emission power of the laser lying in the range about 20 mW to 40 mW.

When the refractive index of the first fluid is greater than that of the second fluid, an "optical trap" effect may be added to the flow blocking effect produced by focusing the laser beam on the fluid interface. This optical trap effect of dipolar origin may also be used to operate the valve or to guide the interface between the two fluids.

Figure 4:
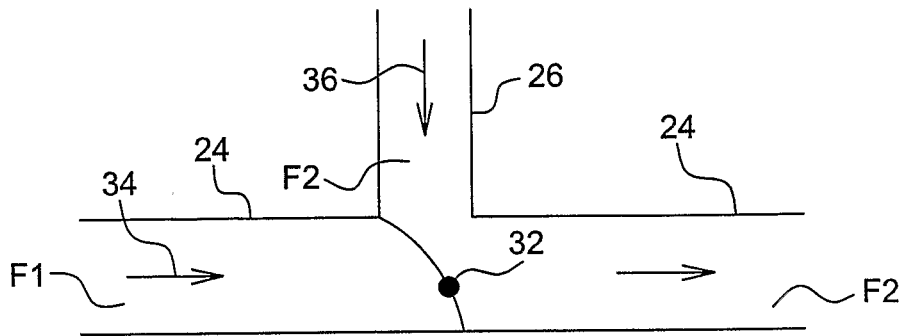
FIGS. 4 and 5 are large-scale diagrammatic views of a variant embodiment of a valve.
Figure 5:
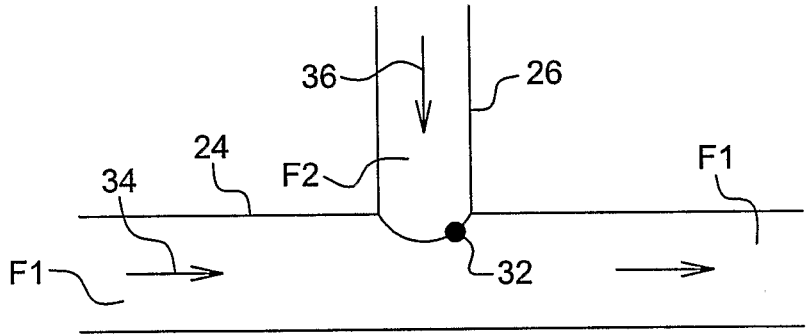

A variant embodiment of a valve is shown in FIGS. 4 and 5, in which the second fluid F2 flows in the direction of arrow 36 in a single microchannel 26 opening out perpendicularly into the microchannel 24 containing the first fluid F1 that flows in the direction of arrow 34.

When the laser beam is focused at 32 on the interface between the two fluids, as shown in FIG. 4, i.e. a little downstream from the axis of the microchannel 26 and on the side opposite from said microchannel relative to the axis of the microchannel 24, it blocks the flow of the first fluid F1 and allows the second fluid F2 to flow.

Conversely, as shown in FIG. 5, if the laser beam is focused at 32 where the microchannel 26 opens out into the microchannel 24, it blocks the flow of the second fluid F2 and allows the first fluid F1 to pass downstream along the microchannel 24.

Figure 6:
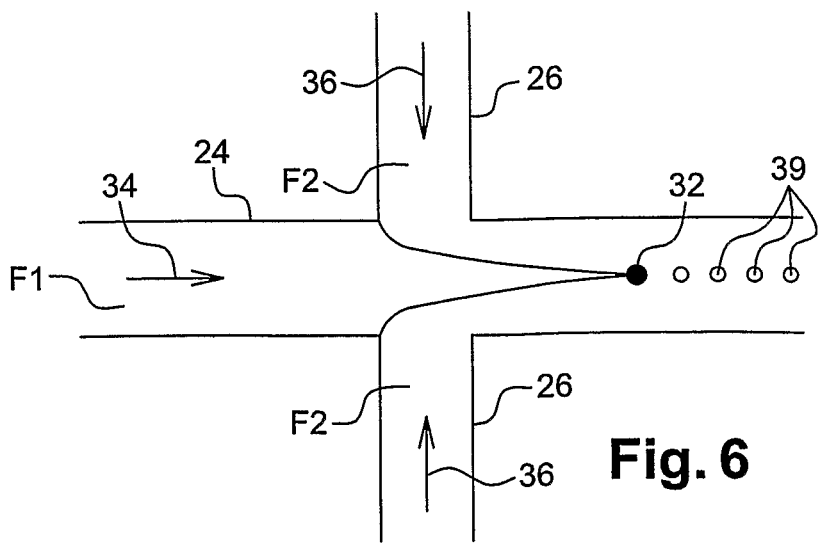
FIG. 6 is a large-scale diagrammatic view showing the fractioning of a jet of drops.

In FIG. 6, the laser beam is focused at 32 on the interface between an axial jet of the first fluid F1 in the second fluid F2, downstream from the intersection of the microchannel 24 with the two microchannels 26 in which the second fluid F2 flows.

Repeated on/off switching of the laser causes the jet of fluid F1 to be subdivided into drops 39 in the fluid flow F2 by Rayleigh-Plateau instability, with the size of the drops being a function of the ratio between the frequency of the laser-forcing and the speed of the flow.

Figure 7:
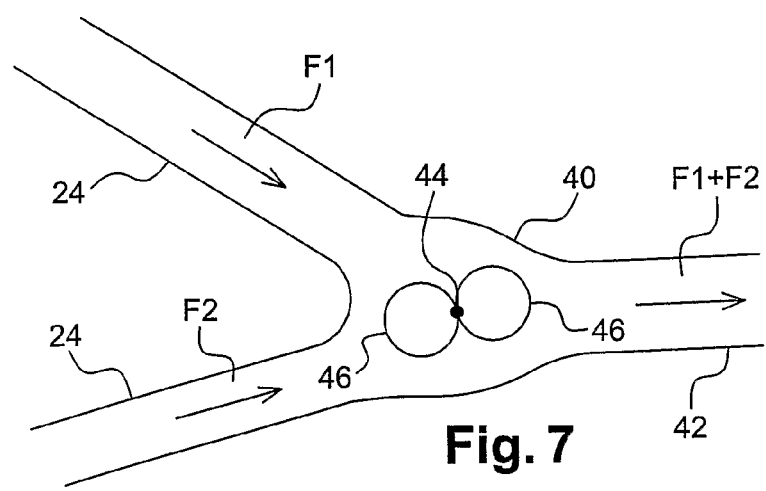
FIG. 7 is a large-scale diagrammatic view of a mixer of the invention.

FIG. 7 shows a configuration in which the laser beam is used to constitute a mixer for mixing together two miscible fluids at the confluence of two microchannels 24, one of which carries a flow of a fluid F1 in the direction indicated by the arrow and the other carries a flow of another fluid F2 in the direction indicated by the other arrow, the two microchannels 24 meeting in a chamber 40 from which the fluid mixture F1+F2 can escape via a microchannel 42.

In order to mix the two fluids together, the laser beam 12 is focused on a particle 44 of solid material that is located in the chamber 40 at the confluence of the microchannels 24 and which is suitable for generating or releasing one or more bubbles of gas 46, e.g. bubbles of air, when heated by the laser beam 12.

The bubble(s) 46 remain(s) attached to the solid particle 44 which may have a rough surface. In a variant, the bubble(s) 46 may be present on the solid particle 44 before it is heated by the laser beam 12.

When the solid particle 44 is heated by the laser beam, the shape of the or each bubble 46 changes in a manner that is very complex and very fast, and a flow is induced over the interface between said bubble and each of the fluids F1 and F2. This results in a flow for the fluids F1 and F2 that is random in time, thereby producing good mixing of these fluids.

The solid particle may be a crystal of fluorescein, a polymer bead (e.g. of PDMS), or any black body, e.g. a particle of carbon black, that presents good resistance to operating conditions.

Its dimensions may be about 10 μm.

The laser beam may also be used to modify the flow direction of a fluid in the microchannels of the circuit 18.

Figures 8, 9:
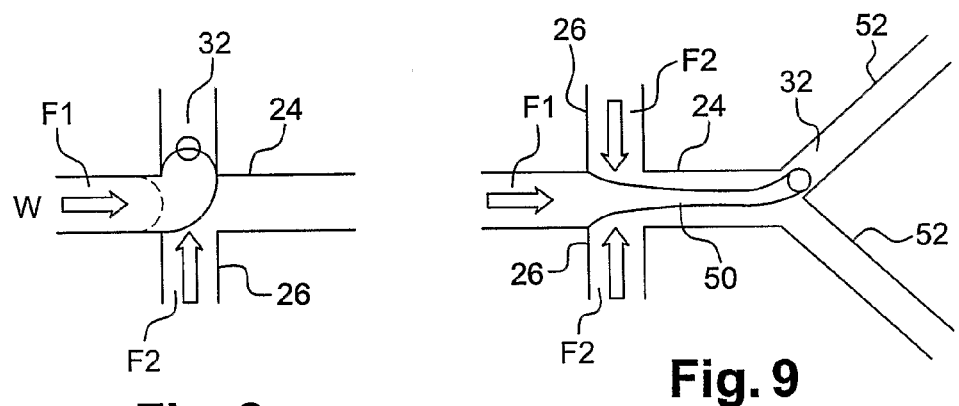
FIGS. 8 and 9 are diagrams showing means for steering a flow.

FIG. 8 shows a configuration in which a first fluid F1 flows in a microchannel 24 that is intersected at right angles by a second microchannel 26 in which another fluid F2 flows. If the point of impact 32 of the laser beam 12 is placed immediately downstream from the intersection between the microchannels, inside the second microchannel 26, then the first fluid F1 is caused to change its direction and flow into the downstream portion of the second microchannel 26.

FIG. 9 shows a configuration in which a first fluid F1 flows in a first microchannel 24 having opening out face to face therein two microchannels 26 carrying a flow of a second fluid F2.

Downstream from the intersection of the microchannels 24 and 26, the fluid F1 forms a central stream that flows inside the fluid F2 to a fork zone in the microchannel 24 where it splits into two microchannels 52.

If the laser beam 12 is focused on a point 32 that is situated on the stream 50 at the upstream end of one of the two microchannels 52, then the stream 50 is diverted towards said microchannel 52 and prevented from passing into the other microchannel 52.

It is also possible to move the laser beam 12 quickly over different predetermined zones of a circuit 18 so as to perform a certain number of functions in said different zones, taking advantage of the reaction time of the fluid, which can be relatively long compared with the speed at which the laser beam can be moved, e.g. using a mirror under galvanometer or piezoelectric control.

Figure 10:
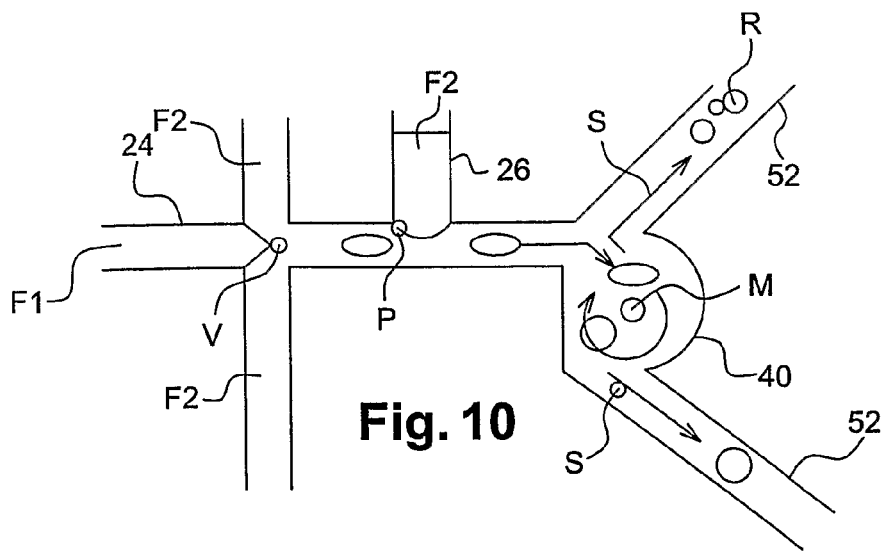
FIG. 10 is a diagram showing a microfluidic circuit of the invention comprising a valve, a pump, a mixer, and separator and sorting means.

As shown diagrammatically in FIG. 10, it is thus possible to form a valve V by focusing the laser beam in the zone of the intersection between a first microchannel 24 carrying a flow of a first fluid F1 and two microchannels 26 carrying flows of a second fluid F2, and then downstream to form a pump P by focusing the laser beam on the opening of a third microchannel 26 containing the fluid F2, and downstream to implement a mixer M by focusing the laser beam on a solid particle, and then to perform sorting by means of separators S formed by focusing the laser beam on the upstream ends of the two microchannels 52 leaving the mixer chamber 40.

When drops of one of the fluids follow one another along a microchannel 52, they can be collected together by focusing the laser beam at R on the interface of one of these drops, as shown diagrammatically in FIG. 10.

The invention claimed is:

1. A microfluidic circuit comprising at least one microchannel containing a first fluid and at least one means for focusing a laser beam, the microchannel being formed in a material that is transparent to said laser beam, wherein the laser beam is focused on an interface between said first fluid and a second fluid which is present at least locally in said microchannel, the laser beam being configured and arranged to heat locally the interface between the fluids to cause one of the fluids to move by thermocapillary convection.

2. A circuit according to claim 1, characterized in that the second fluid is contained in two second microchannels opening out face to face into the first microchannel containing the first fluid.

3. A circuit according to claim 1, characterized in that it comprises a plurality of active components formed by focusing the said laser beam, and means for rapidly scanning locations of said components with the laser beam, said components being selected from the group comprising: pumps; valves; measuring means; mixers; separators; and steering means.

4. A circuit according to claim 1, characterized in that the means for focusing the laser beam form a spot on the interface between the said first and second fluids, the spot having a diameter lying in the range about 5 μm to about 15 μm.

5. A circuit according to claim 1, characterized in that the emission of the laser beam is continuous or pulsed with a repetition of frequency greater than about 1 kHz, and its emission power lies in the range about 10 mW to about 50 mW.

6. A circuit according to claim 1, characterized in that the second fluid is contained in at least one second microchannel or a cavity opening out into the first microchannel containing the first fluid.

7. A circuit according to claim 6, characterized in that the two fluids are not miscible and focusing the laser beam on the said interface forms a pump that generates a flow of the first fluid in the first microchannel.

8. A circuit according to claim 6, characterized in that the two fluids are not miscible and focusing the laser beam on the interface between the two fluids in a zone situated at the intersection of the first microchannel and the second microchannel(s) forms a valve preventing the first fluid from flowing in the first microchannel.

9. A circuit according to claim 1, characterized in that said interface is formed between the first fluid and a bubble or a drop of the second fluid.

10. A circuit according to claim 9, characterized in that it includes a bubble of gas situated in a zone of confluence between the first fluid and another fluid that is miscible with the first fluid, and in that focusing the laser beam on the interface of said bubble with said fluids serves to mix the fluids.

11. A circuit according to claim 10, characterized in that said bubble is held on a solid particle onto which the laser beam is focused.

12. A circuit according to claim 11, characterized in that said bubble is created on the solid particle by the laser beam.

* * * * *